United States Patent
Happenhofer et al.

(10) Patent No.: US 6,279,528 B1
(45) Date of Patent: Aug. 28, 2001

(54) INTAKE DEVICE

(75) Inventors: Werner Happenhofer, Wackersdorf; Mathias Scheytt, Neutraubling; Stefan Schmidt, Obertraubling; Helmut Schwaiger, Regensburg, all of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/426,423

(22) Filed: Oct. 25, 1999

Related U.S. Application Data

(63) Continuation of application No. PCT/DE98/00797, filed on Mar. 18, 1998.

(30) Foreign Application Priority Data

Apr. 24, 1997 (DE) .................................................. 197 173 49

(51) Int. Cl.[7] .................................................. F02M 35/10
(52) U.S. Cl. .................................. 123/184.53; 123/184.44
(58) Field of Search ....................... 123/184.21, 184.38, 123/184.42, 184.53, 184.55, 184.56, 184.57, 184.61, 184.26, 184.44, 184.59, 336, 337, 184.36, 184.49; 251/305, 304; 384/147, 148, 151, 152, 153

(56) References Cited

U.S. PATENT DOCUMENTS

| | | | |
|---|---|---|---|
| 2,570,117 | * 10/1951 | Hallstrand | 384/152 |
| 4,803,961 | 2/1989 | Hiraoka et al. | |
| 4,907,547 | 3/1990 | Daly | |
| 5,188,078 | * 2/1993 | Tamaki | 123/403 |
| 5,348,272 | * 9/1994 | Lukstas et al. | 251/214 |
| 5,632,245 | * 5/1997 | Ropertz | 123/337 |
| 5,687,691 | * 11/1997 | Kaiser et al. | 123/337 |
| 5,832,894 | * 11/1998 | Espe et al. | 123/336 |
| 6,016,780 | * 1/2000 | Fischer | 123/184.26 |

FOREIGN PATENT DOCUMENTS

| | | | |
|---|---|---|---|
| 40 41 786 A1 | 6/1992 | (DE) | |
| 42 28 334 A1 | 3/1994 | (DE) | |
| 43 37 975 A1 | 5/1995 | (DE) | |
| 19545746C1 | * 6/1997 | (DE) | F02B/27/02 |
| 0 026 935 A1 | 4/1981 | (EP) | |
| 0 410 871 A1 | 1/1991 | (EP) | |
| 0 701 057 A1 | 3/1996 | (EP) | |
| 2 505 010 | 11/1982 | (FR) | |
| 2 613 428 | 10/1988 | (FR) | |

OTHER PUBLICATIONS

International Publication No. WO 95/16112, Jun. 15, 1995.
International Publication No. WO 96 07022 A1 (Espe et al.), dated Mar. 7, 1996.

* cited by examiner

*Primary Examiner*—Noah P. Kamen
*Assistant Examiner*—Hai Huynh
(74) *Attorney, Agent, or Firm*—Herbert L. Lerner; Laurence A. Greenberg; Werner H. Stemer

(57) ABSTRACT

Inlet pipes extend from a collector to the cylinder inlets of the internal combustion engine. The inlet pipes are formed with mutually facing openings in their adjacent walls. Control flaps each have a shaft, which is respectively provided with a damping element and is mounted by way of the damping elements in a bearing bush. The openings in the inlet pipes are selectively closed and opened with the control flaps.

6 Claims, 4 Drawing Sheets

INTAKE DEVICE

CROSS-REFERENCE TO RELATED APPLICATION

This is a continuation of copending International Application PCT/DE98/00797, filed Mar. 18, 1998, which designated the United States.

BACKGROUND OF THE INVENTION

FIELD OF THE INVENTION

The invention lies in the automotive technology field. More specifically, the invention pertains to an intake device for an internal combustion engine. The intake device includes a collector or first manifold, which takes in ambient air via an intake connection. Inlet pipes connect the collector to inlets into the cylinders of the internal combustion engine and are disposed closely adjacent one another in a portion between the collector and the cylinders and are formed in their walls with mutually facing, adjacent openings. The openings are selectively opened or closed by at least one control flap with a shaft controlled by a control device.

International publication WO 96/07022 discloses an intake device which comprises inlet pipes that branch off from a collector and lead into inlets of cylinders of the internal combustion engine. Furthermore, the intake device has control flaps, which are respectively arranged in an opening between two inlet pipes and are mounted so as to be pivotable. If the control flaps are pivoted in such a way that the openings are closed, the effective length of the inlet pipes, that is the length over which the gas column in the inlet pipe oscillates, corresponds to the length of the inlet pipes from the collector to the inlets of the cylinders. If the control flaps are pivoted in such a way that the opening is opened, the effective length of the inlet pipes corresponds to the distance from the opening up to the inlets of the cylinders. Depending on measured values of the operating variables of the internal combustion engine, one of the two effective lengths of the inlet pipes is set. Thus, the charging of the cylinders can be improved and the maximum torque can therefore be increased.

Bearing collars are provided at the opening against which the control flap comes to bear when it is pivoted in such a way as to close the opening.

The intake system is a substantial source of engine noise and automotive technology is subject to increasingly stringent statutory provisions which establish the limit values for the amplitude of the sound waves produced by motor vehicles.

SUMMARY OF THE INVENTION

It is accordingly an object of the invention to provide an intake device for an internal combustion engine which overcomes the above-mentioned disadvantages of the heretofore-known devices and methods of this general type and which exhibits reduces noise generation in all operating states of the internal combustion engine.

With the foregoing and other objects in view there is provided, in accordance with the invention, an intake device for an internal combustion engine with a plurality of cylinders having inlets, comprising:

a collector taking in ambient air via an intake connection;

a plurality of inlet pipes extending from the collector to respective inlets of the cylinders of the internal combustion engine, the inlet pipes being closely adjacent one another in a portion between the collector and the cylinders and being formed with mutually facing openings in mutually facing walls;

a controlled control flap formed with a shaft and being pivotally disposed to selectively close the facing openings; and a bearing bush supporting the shaft and a separate, annular damping element inserted in the bearing bush.

The objects of the invention are satisfied in that the shaft of the control flap is provided with a damping element. The damping element is arranged directly on the shaft or else on a mating part fitted onto the shaft. Impact produced by the shaft knocking against the bearing bush is damped in this way. The transmission of noises generated by the knocking of the shaft against the bearing bush to the intake device and the surroundings of a motor vehicle in which the intake device is arranged is additionally damped. A further advantage is that the damping elements increase the seal-tightness of the bearing bush.

In the alternative, the damping element is fitted into the bearing bush. Impact produced by the knocking of the shaft against the bearing bush is damped in this way. The transmission of noise generated by the knocking of the shaft against the bearing bush to the intake device and the surroundings of a motor vehicle in which the intake device is arranged is additionally damped.

In accordance with an added feature of the invention, the damping element is disposed on the shaft.

In accordance with a preferred embodiment, the damping element is formed of elastomer.

In accordance with an additional feature of the invention, first and second sealing hoods are disposed concentrically to the shaft at mutually opposite axial ends of the control flap. Each of the sealing hoods is open to a side remote from the control flap and, on a side towards the control flap they are positive-lockingly connected to the control flap.

In accordance with another feature of the invention, a sealing lip is formed at an edge portion of the control flap and integrally formed in one piece with the first and second sealing hoods.

In accordance with a further feature of the invention, the sealing hoods are each formed with a bead projecting beyond the sealing lip.

In accordance with a concomitant feature of the invention, the first and second sealing hoods are formed of elastomer.

The sealing hoods ensure that the control flap reliably closes the opening in a sealed manner in the radial direction around the shaft. This also compensates for axial play, with the result that production tolerances are compensated and reliable functioning of the throttle valve is ensured in a wide temperature range with seal-tightness at all times. The sealing hood also ensures additional acoustic isolation of the control valve from the intake device.

Other features which are considered as characteristic for the invention are set forth in the appended claims.

Although the invention is illustrated and described herein as embodied in intake device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

Structurally and functionally identical elements are identified with the same reference numerals throughout the figures.

DESCRIPTION OF THE PREFERRED EMBODIMENT

Figure 1:
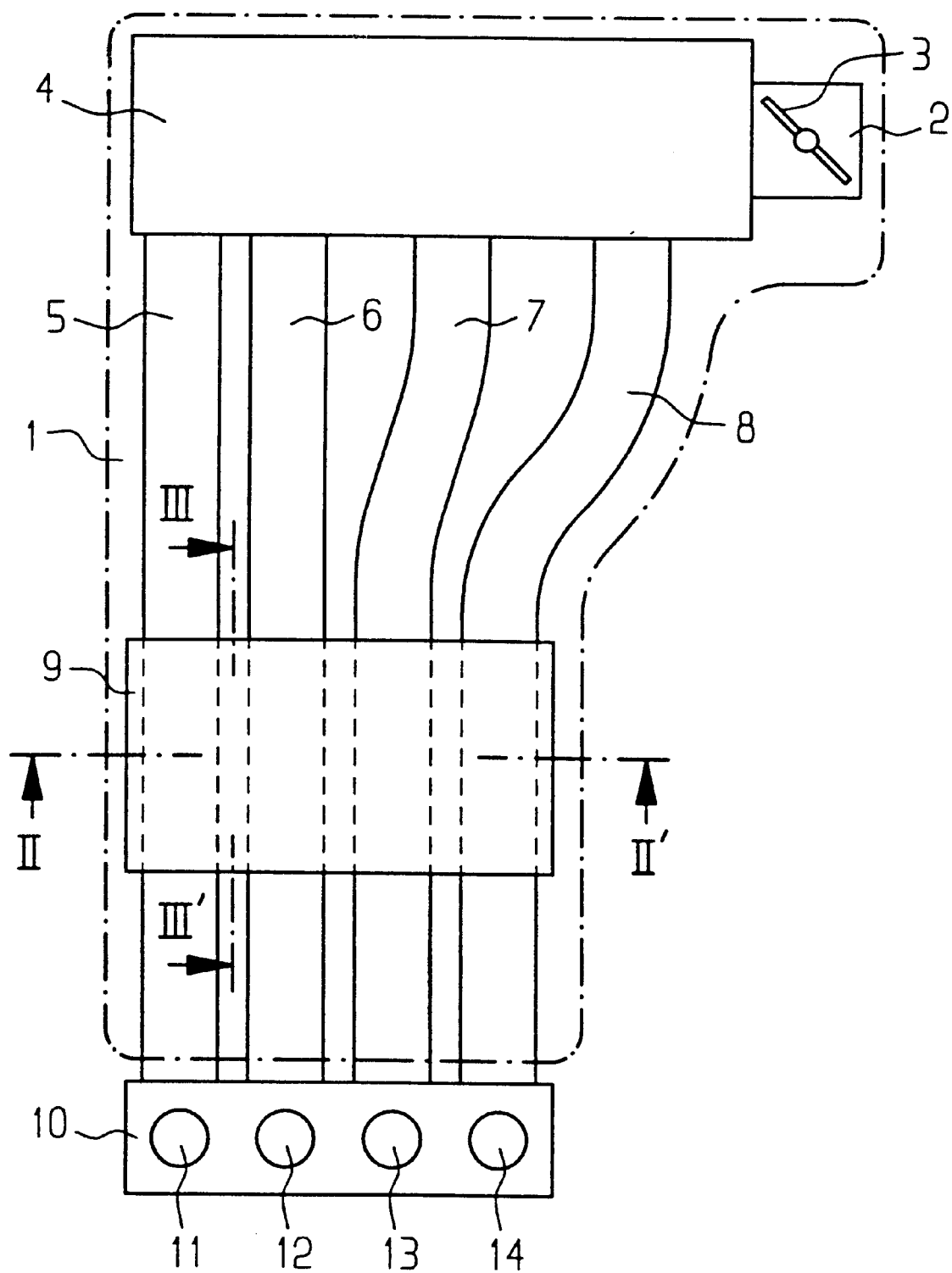
FIG. 1 is a diagrammatic view of an internal combustion engine.

Referring now to the figures of the drawing in detail and first, particularly, to FIG. 1 thereof, there is seen an intake device 1 of an internal combustion engine. The intake device comprises an intake connection 2, in which a throttle valve 3 is arranged. A collector 4 communicates with the ambient air via the intake connection 2. Inlet pipes 5, 6, 7, 8 are run from the collector 4 via a second manifold 9 to inlets of the cylinders 11, 12, 13, 14. The cylinders 11, 12, 13, 14 are arranged in an engine block 10.

Figure 2:
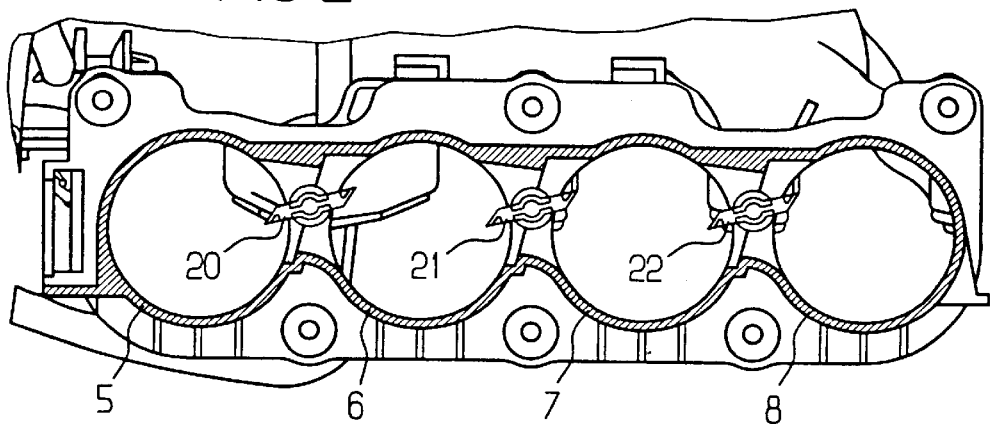
FIG. 2 is a section of the internal combustion engine taken along the line II—II' in FIG. 1.

With reference to FIG. 2, the second manifold 9 has control flaps 20, 21, 22, which are of elongated design and are mounted so as to be pivotable. Depending on an operating variable such as, for example, a rotational speed N of an engine crankshaft and/or an air mass flow and/or an inlet-pipe pressure, the control flaps 20, 21, 22 are pivoted between an open position and a closed position. Pertinent operating states of the internal combustion engine are, for example, engine starting, idling, part load, or full load.

In the open position of the control flaps 20, 21, 22, the inlet pipes 5, 6, 7, 8 communicate with one another via the openings, so that the effective inlet-pipe length, that is the region of continuous flow in the inlet pipe, corresponds to the distance of the openings from the inlets of the cylinders 11, 12, 13, 14. In the closed position of the control flaps, the control flaps close the openings between the inlet pipes 5, 6, 7, 8, so that the effective length of the inlet pipes corresponds to the length of the inlet pipes from the collector 4 up to the inlets of the cylinders 11, 12, 13, 14.

Figure 3:
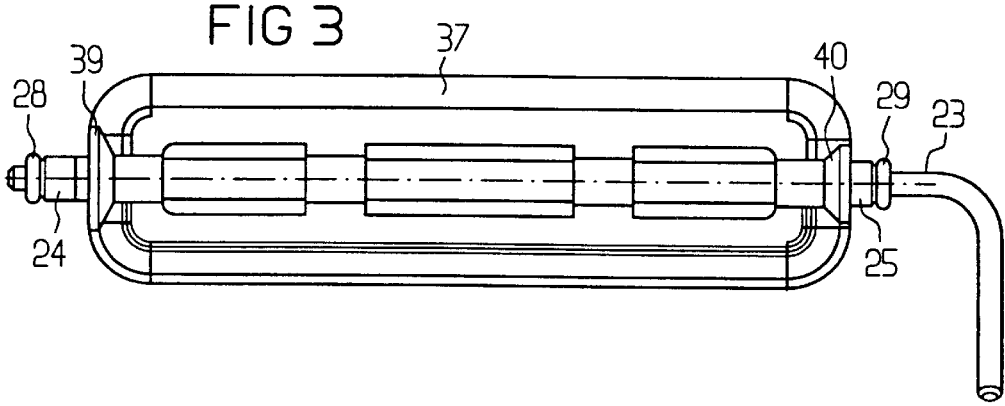
FIG. 3 is a diagrammatic view of a control flap.
Figure 6:
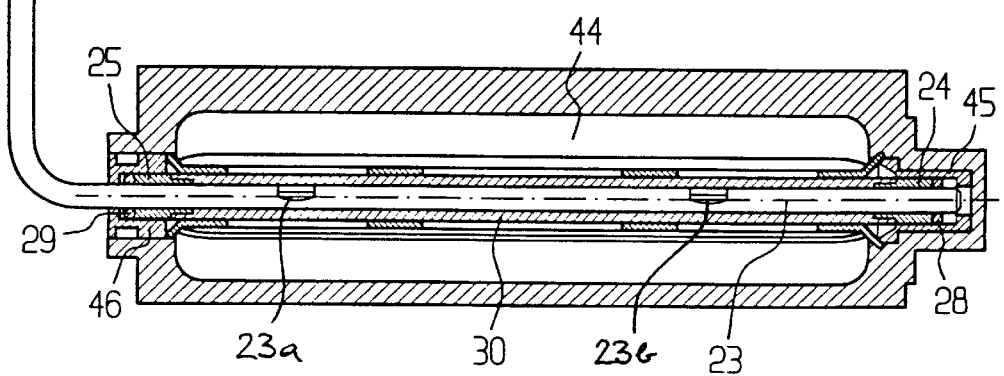
FIG. 6 is a section of the internal combustion engine taken along the line III—III' in FIG. 1.

Referring now to FIG. 3, the control flaps 20, 21, 22 are of identical construction. The following description is directed to the construction of the control flap 20 as a representative example. The control flap 20 has a shaft 23, which is bent at right angles at a free end. As a result, simple pivoting between the open position and the closed position in the fitted state is possible via a non-illustrated linkage, which is driven by an actuator. The actuator is preferably a pressure capsule or an electric motor. The shaft 23 carries a first sleeve 24 and a second sleeve 25 at a predetermined spacing distance. The first and second sleeves 24, 25 are made to be a precise fit and serve for mounting in a bearing bush 45, 46 (FIG. 6). A first and a second damping element are placed on the shaft 23 in such a way that they come to bear with the first sleeve 24 and the second sleeve 25 respectively. The damping elements are preferably identical structures and they are, advantageously, designed as a damping ring 28, 29. This results in low friction between the damping elements and the bearing bush. The damping ring consists of an elastomer.

The shaft 23 is connected to a vane body 30 in a positive-locking manner. The positive-locking connection is effected by embossed lugs 23a, 23b. The shaft 23 and the vane body 30 are therefore rigidly connected. In addition, the vane body 30 may be formed with several apertures which facilitate sealing encapsulation. The vane body 30 is encapsulated with a sealing compound, which is formed in such a way that it forms a sealing lip 37 at the margins of the control flap, and this sealing lip 37, in the closed state, comes to bear with a bearing collar of the opening and thus tightly closes the opening. In addition, the sealing compound forms a first and a second sealing hood 39, 40, which are arranged concentrically to the shaft 23 at the opposite axial ends of the control flap 20. The sealing hoods 39, 40 are each open to the side which is remote from the control flap 20. On the side which faces the control flap, they are connected to the control flap in a positive-locking manner.

Figure 4:
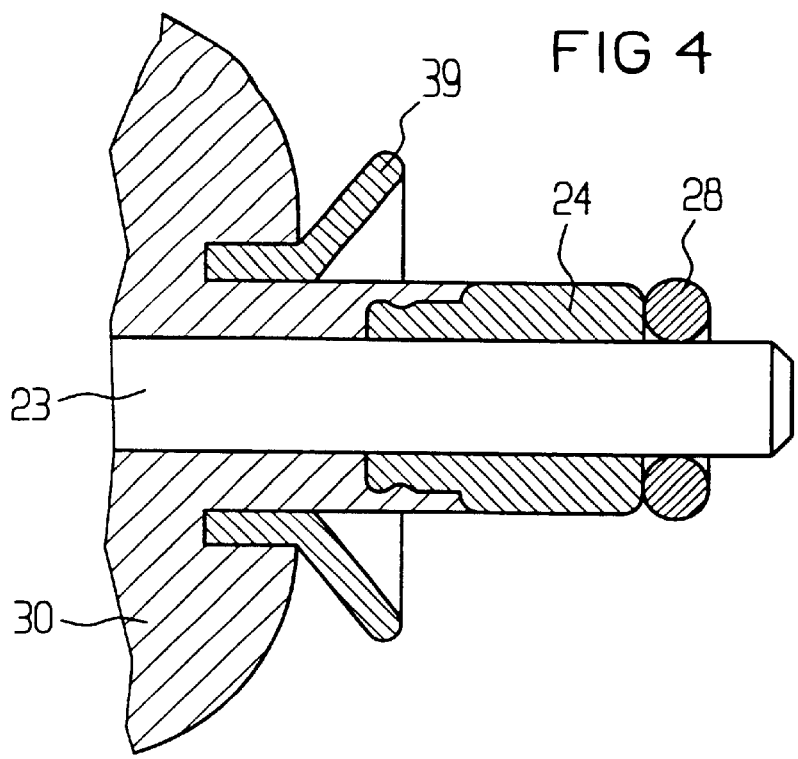
FIG. 4 is a partial section of an enlarged detail of the control flap taken along a rotational axis of the control flap.

FIG. 4 shows an enlarged detail of the control flap 20 in a section along the rotational axis of the control flap. The sealing hood 39 is of conical design. It is made of an elastic material, preferably an elastomer. The sealing hood 39 may also advantageously be of parabolic, hemispherical or cylindrical design.

Figure 5:
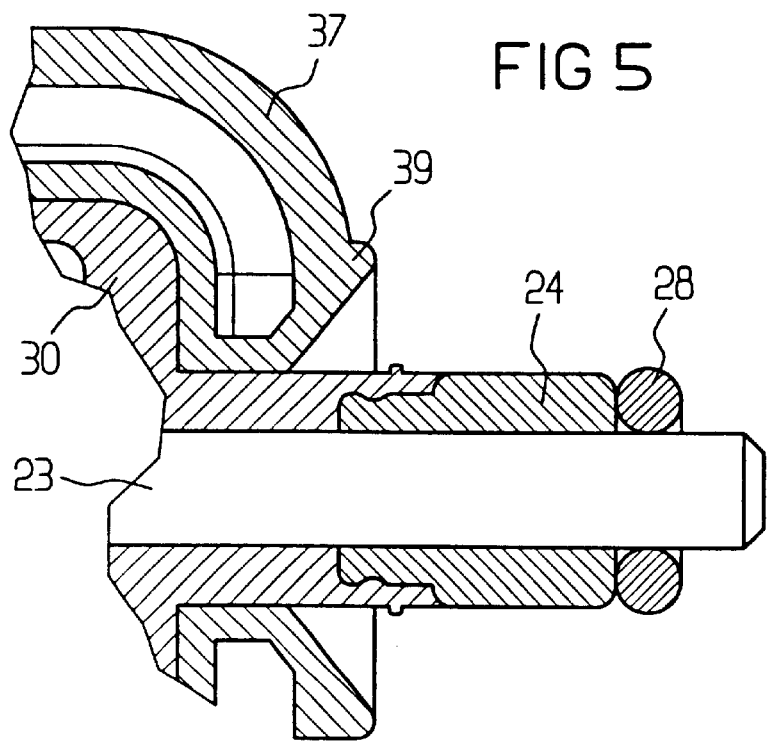
FIG. 5 is a further section of an enlarged detail of the control flap.

FIG. 5 shows an enlarged detail of a preferred embodiment of the control flap 20 in a sectional view along the axis of rotation of the control flap 20. The sealing hood 39 projects beyond the sealing lip 37 in the form of a bead.

FIG. 6 is a sectional representation along a section line III—III' of FIG. 1. The control flap 20 is inserted into an opening 44 and a first bearing bush 45 and a second bearing bush 46. The first and second bearing bushes 45, 46 are preferably produced from bronze and are a precise fit with respect to the first and second sleeves 24, 25. The control flap is shown in its open state in FIG. 6. The first and the second sealing hoods 39, 40 are pressed against the first and the second bearing bushes 45, 46 respectively, but, depending on the applied pressure, can shift outward on account of the elasticity. An axial seal of the control flap around the bearing bush is thus produced with simple means. The axial seal ensures that pressure pulsations in the closed state of the control flap 20 are not transmitted from the inlet pipe 5 to the inlet pipe 6 and vice versa. Furthermore, compensation for axial play with a floating bearing arrangement is effected by the first and second sealing hoods 39, 40. This ensures that the control flap 20 is mounted centrally in the opening 44 irrespective of temperature and irrespective of production tolerances. Furthermore, the sealing hoods 39, 40 dampen noises caused by vibrations of the internal combustion engine and produced by the first or second bearing bush 45, 46 and the first and second sleeves 24, 25 respectively. In addition, the sealing hood 39, 40 greatly dampens an overflow noise which is caused by clattering of the control flap 20 and pressure differences between the inlet pipes 5, 6. This is an important advantage, since the overflow noise becomes audible as unpleasant whistling, and increasingly stringent statutory provisions which establish the limit values for the amplitude of the sound waves produced by a motor vehicle are in force.

Figure 7:
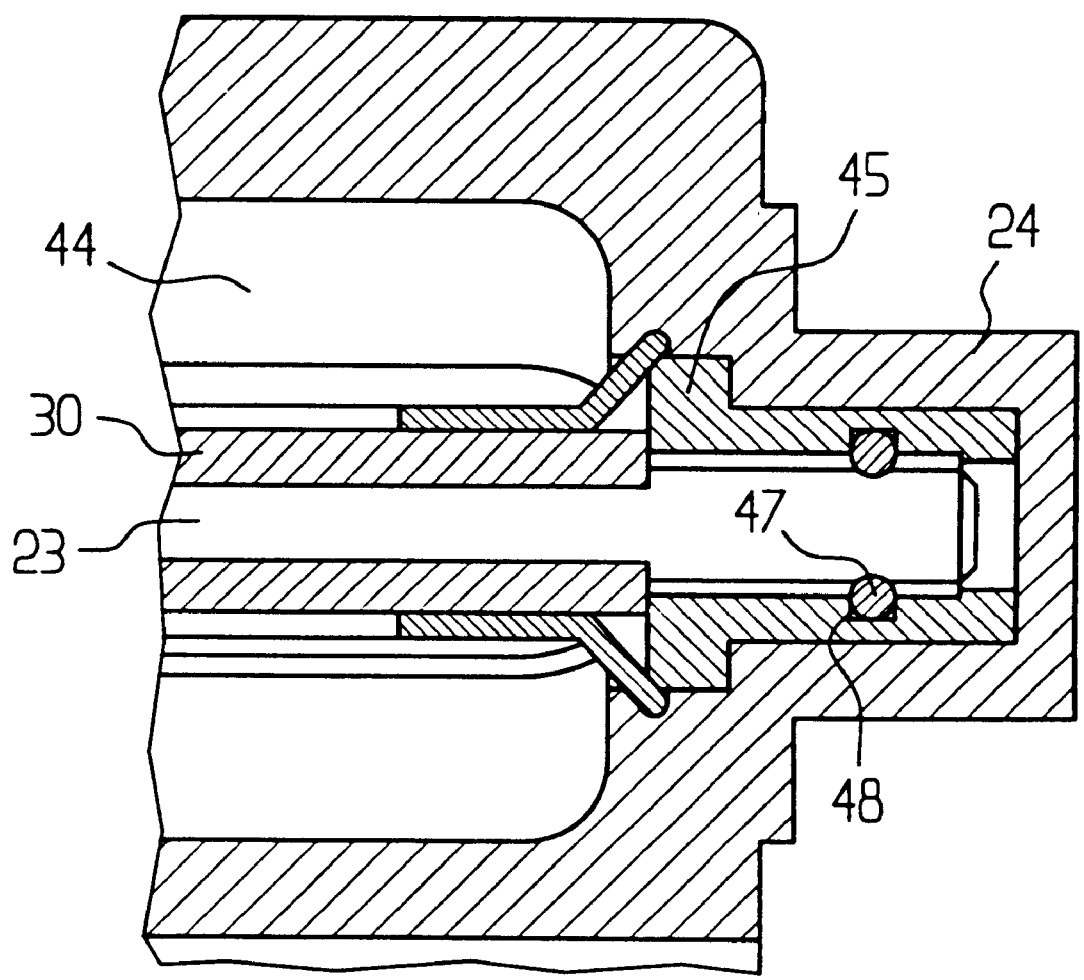
FIG. 7 is an enlarged section of a detail of the intake device.

FIG. 7 represents an enlarged detail of FIG. 6 in an alternative embodiment of the intake device. The shaft 23 is in the region in which it is mounted in the bearing bush, designed to be a precise fit with respect to the bearing bush

45. The damping means is designed as damping ring 47, which is inserted into a groove 48 of the second bearing bush 45.

It will be understood that the vane flap may alternatively also be designed with three or four arms.

We claim:

1. An intake device for an internal combustion engine with a plurality of cylinders having inlets, comprising:

a collector taking in ambient air via an intake connection;

a plurality of inlet pipes extending from said collector to respective inlets of the cylinders of the internal combustion engine, said inlet pipes being closely adjacent one another in a portion between said collector and the cylinders and being formed with mutually facing openings in mutually facing walls;

a controlled control flap formed with a shaft and being pivotally disposed to selectively close said facing openings; and a bearing bush supporting said shaft and a separate, annular damping element inserted in said bearing bush and disposed on said shaft.

2. The intake device according to claim 1, wherein said damping element is formed of an elastomes.

3. The intake device according to claim 1, which further comprises first and second sealing hoods disposed concentrically to said shaft at mutually opposite axial ends of said control flap, each of said sealing hoods being open to a side remote from said control flap and, on a side towards said control flap being positive-lockingly connected to said control flap.

4. The intake device according to claim 3, which comprises a sealing lip formed at an edge portion of said control flap and integrally formed in one piece with said first and second sealing hoods.

5. The intake device according to claim 4, wherein said sealing hoods are formed with a bead projecting beyond said sealing lip.

6. The intake device according to claim 3, wherein said first and second sealing hoods are formed of elastomer.

* * * * *